(12) United States Patent
Sukegawa

(10) Patent No.: US 6,293,617 B1
(45) Date of Patent: Sep. 25, 2001

(54) EXTRUDED MATERIAL FRAME CONNECTION STRUCTURE FOR VEHICLE

(75) Inventor: Akihiro Sukegawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/415,463

(22) Filed: Oct. 14, 1999

(30) Foreign Application Priority Data

Oct. 15, 1998 (JP) .................................................. 10-293969

(51) Int. Cl.[7] .................................................. B62D 27/02
(52) U.S. Cl. .......................... 296/203.03; 296/29; 296/30; 296/194; 296/203.02; 296/205; 296/209
(58) Field of Search .................................. 296/205, 209, 296/203.02, 203.03, 194, 29, 30

(56) References Cited

U.S. PATENT DOCUMENTS

| | | | |
|---|---|---|---|
| 4,355,844 | | 10/1982 | Muzzarelli . |
| 4,660,345 | * | 4/1987 | Browning ............................. 296/205 |
| 4,973,103 | * | 11/1990 | Imajyo et al. ........................ 296/203 |
| 5,018,781 | * | 5/1991 | Kumasaka et al. .................. 296/203 |
| 5,116,161 | * | 5/1992 | Faisst ................................... 403/231 |
| 5,226,696 | * | 7/1993 | Klages et al. ........................ 296/203 |
| 5,372,400 | * | 12/1994 | Enning et al. ....................... 296/203 |
| 5,715,643 | * | 2/1998 | Parkinson ............................ 296/205 |
| 5,848,853 | * | 12/1998 | Clenet ................................... 296/205 |
| 6,022,070 | * | 2/2000 | Ashina et al. ........................ 296/205 |

FOREIGN PATENT DOCUMENTS

| | | |
|---|---|---|
| 40 09 401 | 9/1991 | (DE) . |
| 42 34 463 | 4/1994 | (DE) . |
| 196 06 590 | 8/1997 | (DE) . |

\* cited by examiner

*Primary Examiner*—D. Glenn Dayoan
*Assistant Examiner*—G Blankenship
(74) *Attorney, Agent, or Firm*—Sughrue, Mion, Zinn, Macpeak & Seas, PLLC

(57) ABSTRACT

An extruded material frame connection structure for a vehicle, which is constituted by a frame assembly and a reinforcing cover. The frame assembly includes a first extruded member and a second extruded member which are assembled in a state where the first and second extruded members intersect each other and which are welded to each other at an assembled portion thereof so as to be integrated with each other. The reinforcing member is formed to have a size so that the reinforcing member covers the assembled portion between the first and second extruded members and extends to cover portions of the first and second extruded members, the reinforcing member being assembled to the frame assembly and welded to each of the first and second extruded members. With the configuration, it is possible to obtain a frame connection structure in which not only a necessary strength can be secured but also thermal distortion can be suppressed.

9 Claims, 6 Drawing Sheets

EXTRUDED MATERIAL FRAME CONNECTION STRUCTURE FOR VEHICLE

BACKGROUND OF THE INVENTION

1. Field of the Invention

The present invention relates to an extruded material frame connection structure for a vehicle.

2. Background Art

In order to reduce the weight of a vehicle, use of an aluminum material as a vehicle body constituent member has been heretofore thought of. On the other hand, a frame structure shown in FIG. 5 is used in a passenger car. In this frame structure, side sills 11 in a vehicle floor portion, front pillars 12, center pillars 13, and so on, are made from an aluminum extruded material, and those members are combined and connected integrally with one another.

In the aforementioned frame structure, for example, a side sill and a front pillar which are to be substantially perpendicular to each other may be connected to each other as follows. As shown in FIG. 6, the side sill 11 and the front pillar 12 are aluminum extruded materials having different sectional shapes respectively. Accordingly, it is thought of that, for example, a cast joint member 14 is used in a portion of combination of the two members 11 and 12 to attach the two members 11 and 12 to the joint member 14 to thereby connect the two members 11 and 12 to each other.

In the aforementioned insertion structure, however, there are problems as follows. For example, it may be difficult to assemble the two members in accordance with the angle between the two members due to the frame shape. Further, although the welding lengths of the two insertion portions need to be as large as possible in order to enhance strength, the welding lengths are limited because thermal distortion is intensive in the case of an aluminum material. Accordingly, if multi-point spot welding is used, a welding current becomes large.

SUMMARY OF THE INVENTION

It is therefore an object of the present invention to solve the aforementioned problems and to provide an extruded material frame connection structure in which not only a necessary strength can be secured but also thermal distortion can be suppressed.

In order to achieve the above object, according to an aspect of the present invention, there is provided an extruded material frame connection structure for car use, which comprises: a frame assembly constituted by a first extruded member and a second extruded member which are assembled in a state where the first and second extruded members intersect each other and which are welded to each other at an assembled portion thereof so as to be integrated with each other; and a reinforcing member formed to have a size so that the reinforcing member covers the assembled portion between the first and second extruded members and extends to cover portions of the first and second extruded members, the reinforcing member being assembled to the frame assembly and welded to each of the first and second extruded members.

With this configuration, not only the portion of combination of the extruded materials can be reinforced with the reinforcing member but also the strength of the portion of combination of the extruded materials can be intensified without an increase of welding length when aluminum extruded materials are used as the extruded materials.

Preferably, the assembled portion between the first and second extruded members is a corner portion of the frame assembly, and either one of the first and second extruded members is chamfered at the corner portion, and the reinforcing member is shaped like a circular arc at the corner portion.

With this configuration, it is possible to avoid stress concentration in the reinforcing members.

Preferably, the reinforcing member is constituted by a pair of half parts having mating surfaces perpendicular to a direction of extrusion or longitudinal axis of each of the first and second extruded members.

With this configuration, also in the case where members having different sectional areas are to be connected to each other, a reinforcing member can be assembled with the members to be connected so that a connection portion between the members is entirely enveloped in the reinforcing member.

The present disclosure relates to subject matter contained in Japanese Patent Application No. Hei. 10-293969, filed on Oct. 15, 1998, and which is expressly incorporated herein by reference in its entirety.

DETAILED DESCRIPTION OF PREFERRED EMBODIMENTS

Figure 1:
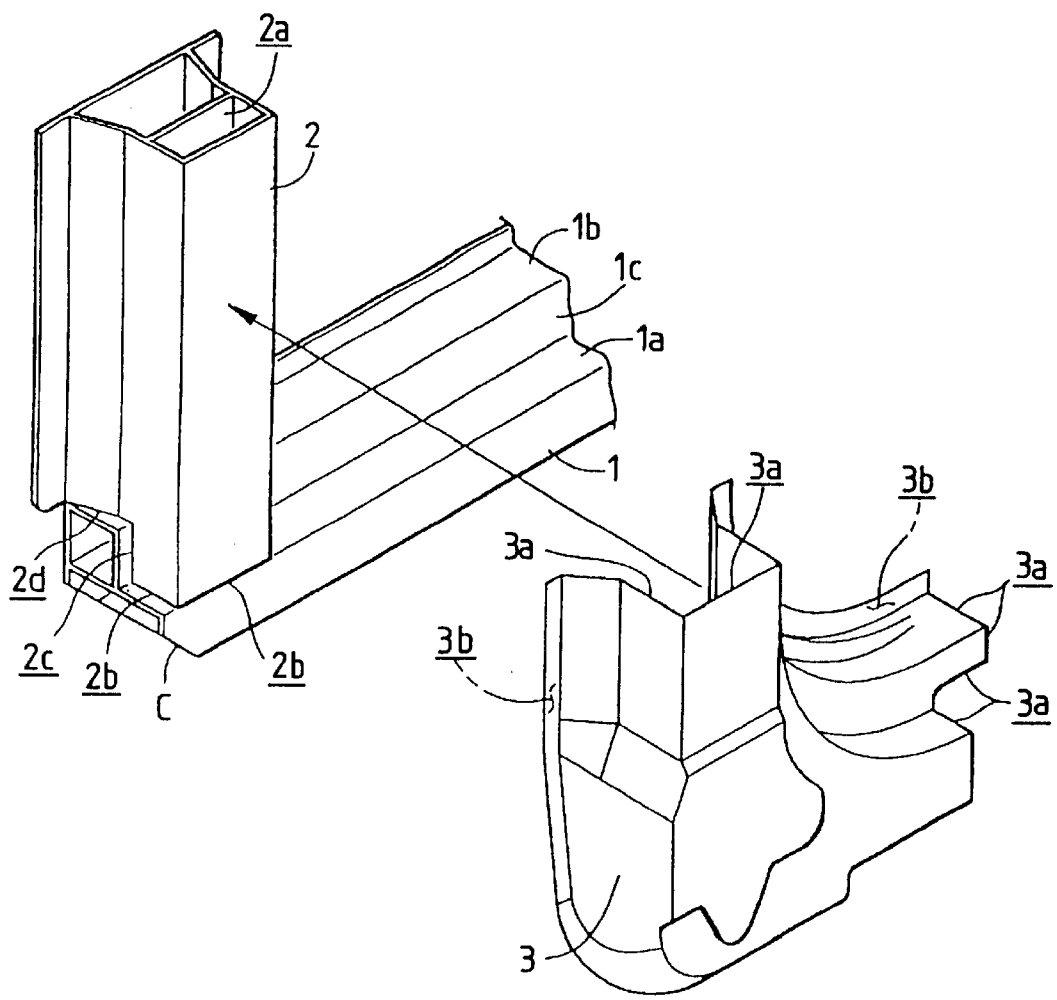
FIG. 1 is a partly enlarged exploded perspective view of a frame structure for a vehicle according to the present invention.

The present invention will be described below in detail on the basis of embodiments illustrated in the accompanying drawings. FIG. 1 is a partly enlarged exploded perspective view of a car-use frame structure according to the present invention. FIG. 1 shows a connection portion (a corner portion in the front of a floor portion) between a side sill 1 as a first member and a front pillar 2 as a second member. Incidentally, the side sill 1 and the front pillar 2 are constituted by aluminum extruded members which are formed from an aluminum material by extrusion molding so as to have necessary sectional shapes respectively.

The side sill 1 is substantially shaped like a stairstep "L" figure in sectional view as shown in FIG. 1. A lower end portion of the front pillar 2 is set perpendicular to a frontal end portion of the side sill 1 in a vehicle. In this embodiment, the lower end portion of the front pillar 2 is partially cut to have an L-shaped cut surface so that the L-shaped cut surface coincides with the stairstep shape of the side sill 1. Further, the front pillar 2 is shaped like a "日" figure (in other words, the number eight as it appears on a seven segment display) in sectional view by extrusion molding as shown in FIG. 1. An intermediate wall 2a which is one of the constituent parts of the "日" sectional shape is exposed in the lower end portion cut as described above. An exposed portion of the intermediate wall 2a abuts on an upstanding portion 1c.

Specifically the front pillar 2 is connected to the side sill 1 by welding in such a manner as follows. That is, the lower end of the front pillar 2 is made to abut on a lower step portion 1a in the stairstep shape of the side sill 1, the intermediate wall 2a of the front pillar 2 is made to abut on the upstanding portion 1c of the side sill 1, and a cut portion of the front pillar 2 is made to abut on an upper step portion 1b of the side sill 1. Then, spot welding is carried out in suitable places in an edge 2b of the lower end portion of the front pillar 2 abutting on the step portion 1a, in an edge 2c of the intermediate wall 2a abutting on the upstanding portion 1c, and in an edge 2d of the cut portion abutting on the upper step portion 1b. Thus, since the spot welding is given to the edges which are stairstepwise abutting on the side sill 1, the total welding length can be elongated. Accordingly, the bonding strength can be made relatively large even in the case where full welding having a tendency to generate thermal distortion is not performed.

Figure 2:
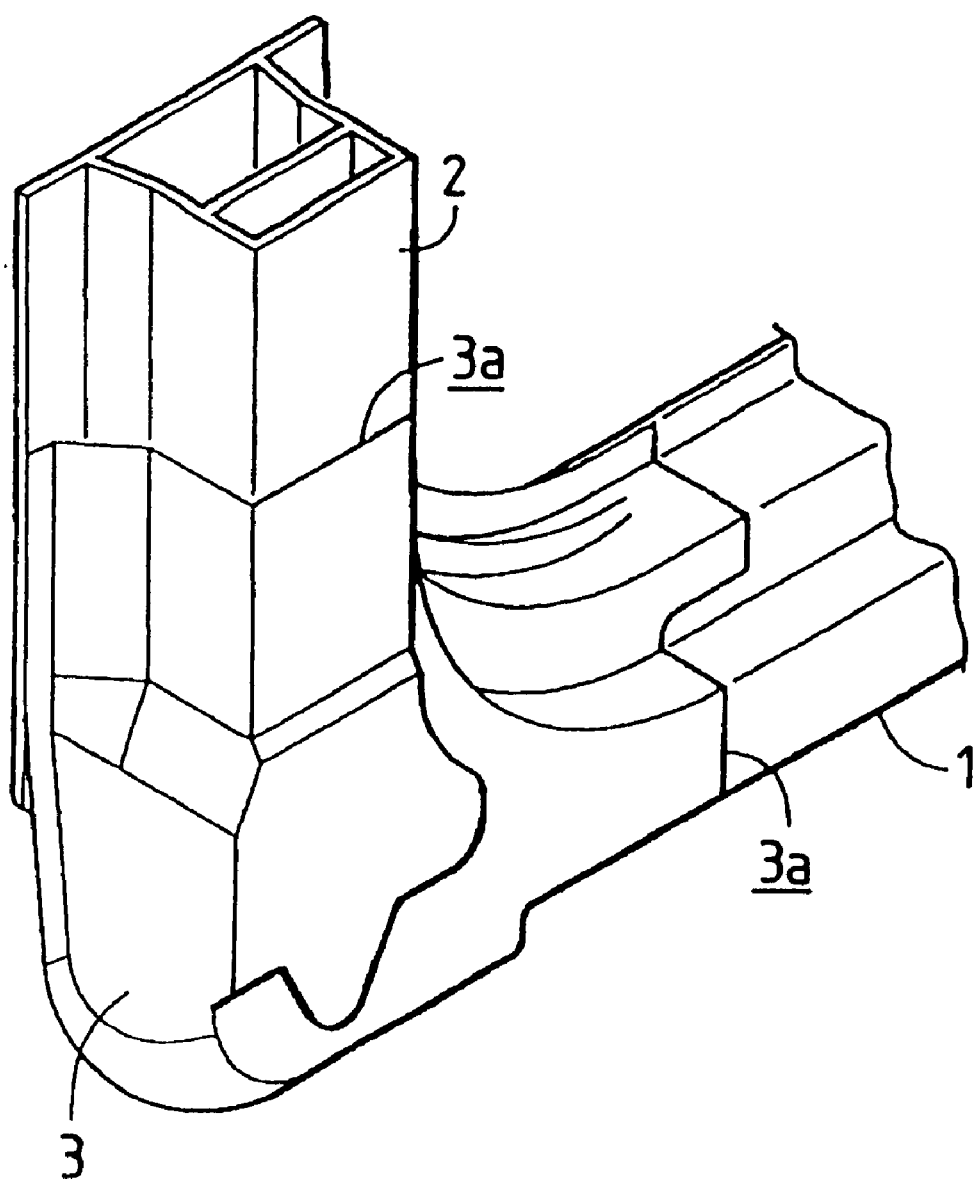
FIG. 2 is a view corresponding to FIG. 1, showing a state in which a reinforcing member is assembled with the members to be connected.

Further, as shown also in FIG. 2, a reinforcing member 3 for reinforcing the connection portion between the side sill 1 and the front pillar 2 in the integrated state is assembled in a comer portion of the frame structure shown in FIGS. 1 and 2. Incidentally, as shown in FIGS. 1 and 2, the lower side of the frontal end portion of the side sill 1 is chamfered (C). Accordingly, the reinforcing member 3 is shaped like a circular arc corresponding to the chamfered shape of the side sill 1. Concentration of stress in the reinforcing member 3 is avoided by the circular arc shape of the reinforcing member 3.

Further, the reinforcing member 3 is fully welded, at its edge portions 3a, to the portions of the side sill 1 and the front pillar 2 which are used as a frame so that the reinforcing member 3 is integrated with the side sill 1 and the front pillar 2. Further, the reinforcing member 3 is welded to the portions of the side sill 1 and the front pillar 2 which are used as edge portions at its surface portions 3b which are perpendicular to the extruding direction of the side sill 1 and the front pillar 2.

In this manner, the side sill 1 and the front pillar 2 are directly welded to each other, and the outside of the connection portion between the side sill 1 and the front pillar 2 is further welded to the reinforcing member 3 so as to be covered with the reinforcing member 3 serving as a joint or coupler to thereby integrate the respective members. Accordingly, it is possible to secure the large strength of the connection portion between the members having different sectional shapes, such as the side sill 1 and the front pillar 2. The degree of freedom in design of a frame structure using extruded members is high.

Figure 3:
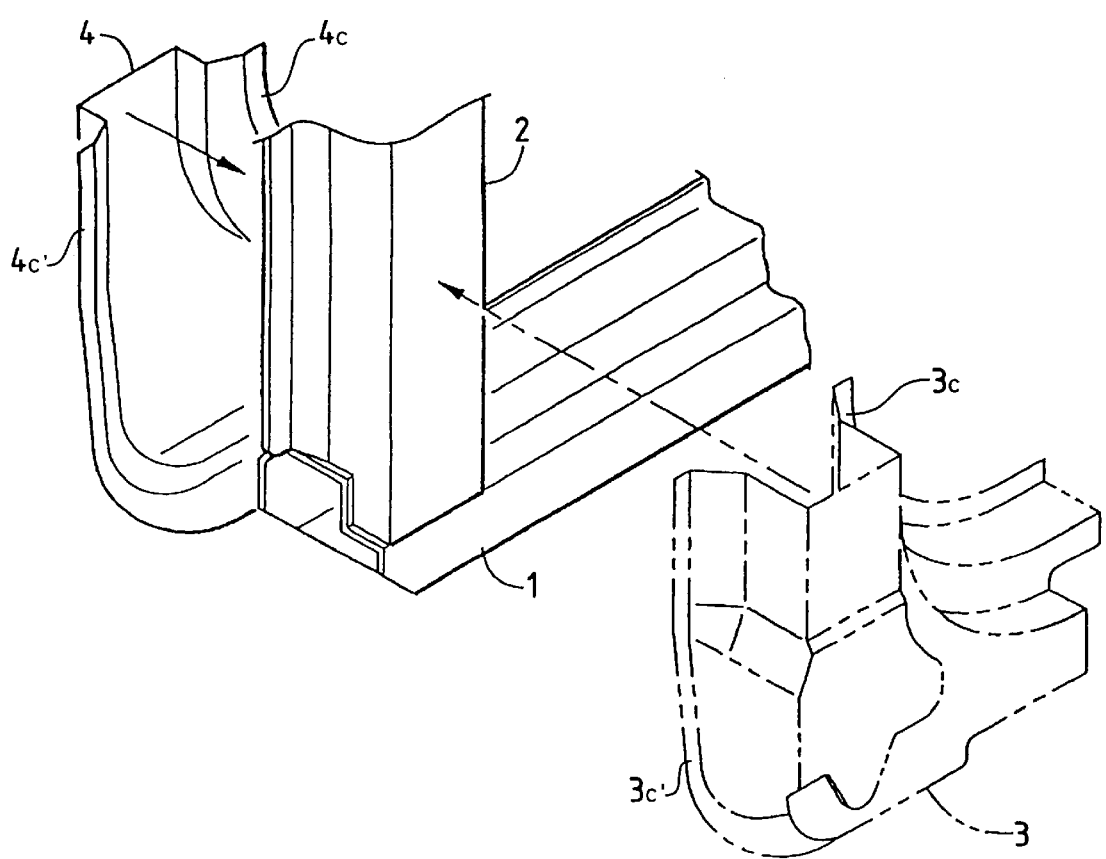
FIG. 3 is a view corresponding to FIG. 1, showing another embodiment of the reinforcing member.

Further, as shown in FIG. 3, a counter reinforcing member 4 which is formed so as to be fitted to the reinforcing member 3 may be used so that the connection portion between the side sill I and the front pillar 2 is received in between the two reinforcing members 3 and 4 serving as a pair of half parts having respective mating surfaces 3c and 4c. As a result, when, for example, the thickness of the side sill 1 is different from that of the front pillar 2 as shown in FIG. 3, the two reinforcing members 3 and 4 can be provided so that a smaller one of the extruded members is sandwiched between the two reinforcing members 3 and 4 on opposite sides. Accordingly, the strength can be enhanced more greatly.

The present invention is not limited to the connection structure between the side sill 1 and the front pillar 2. The present invention can be applied also to a connection structure between the side sill 1 and a center pillar 5 as shown in FIG. 4.

Figure 4:
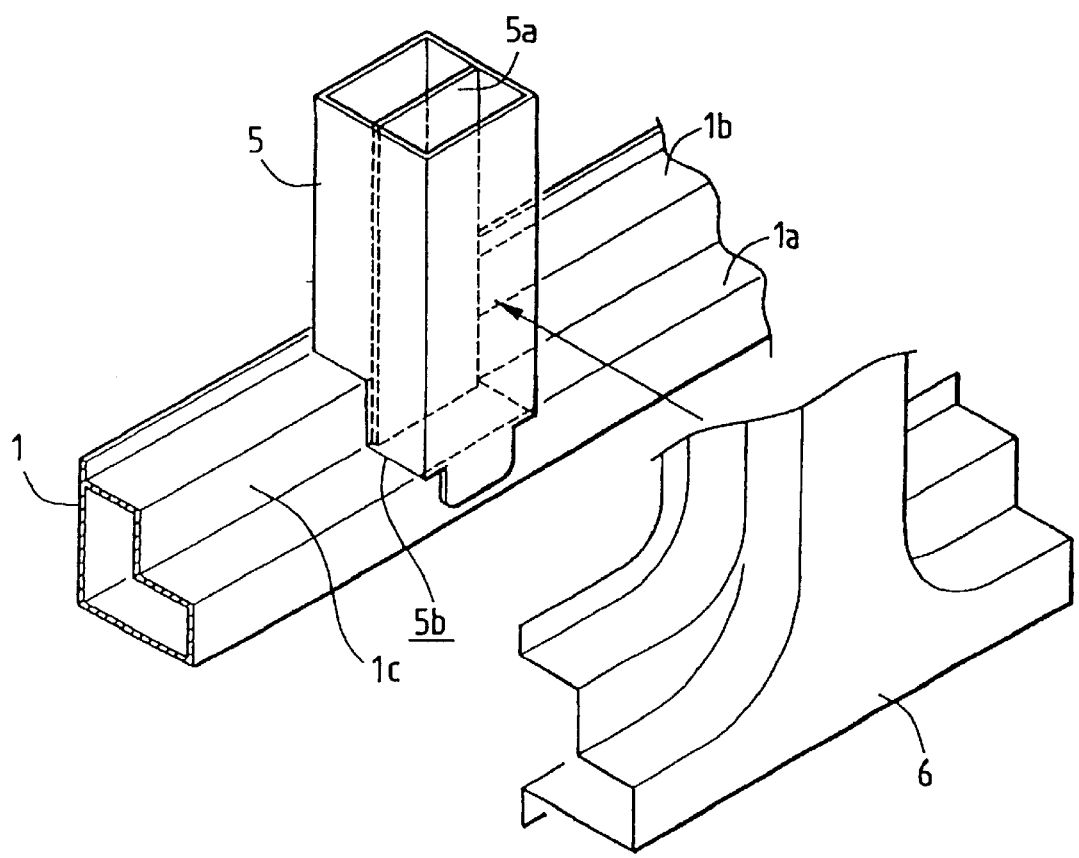
FIG. 4 is a view corresponding to FIG. 1, showing a state in which the present invention is applied to connection of other members.
Figure 5:
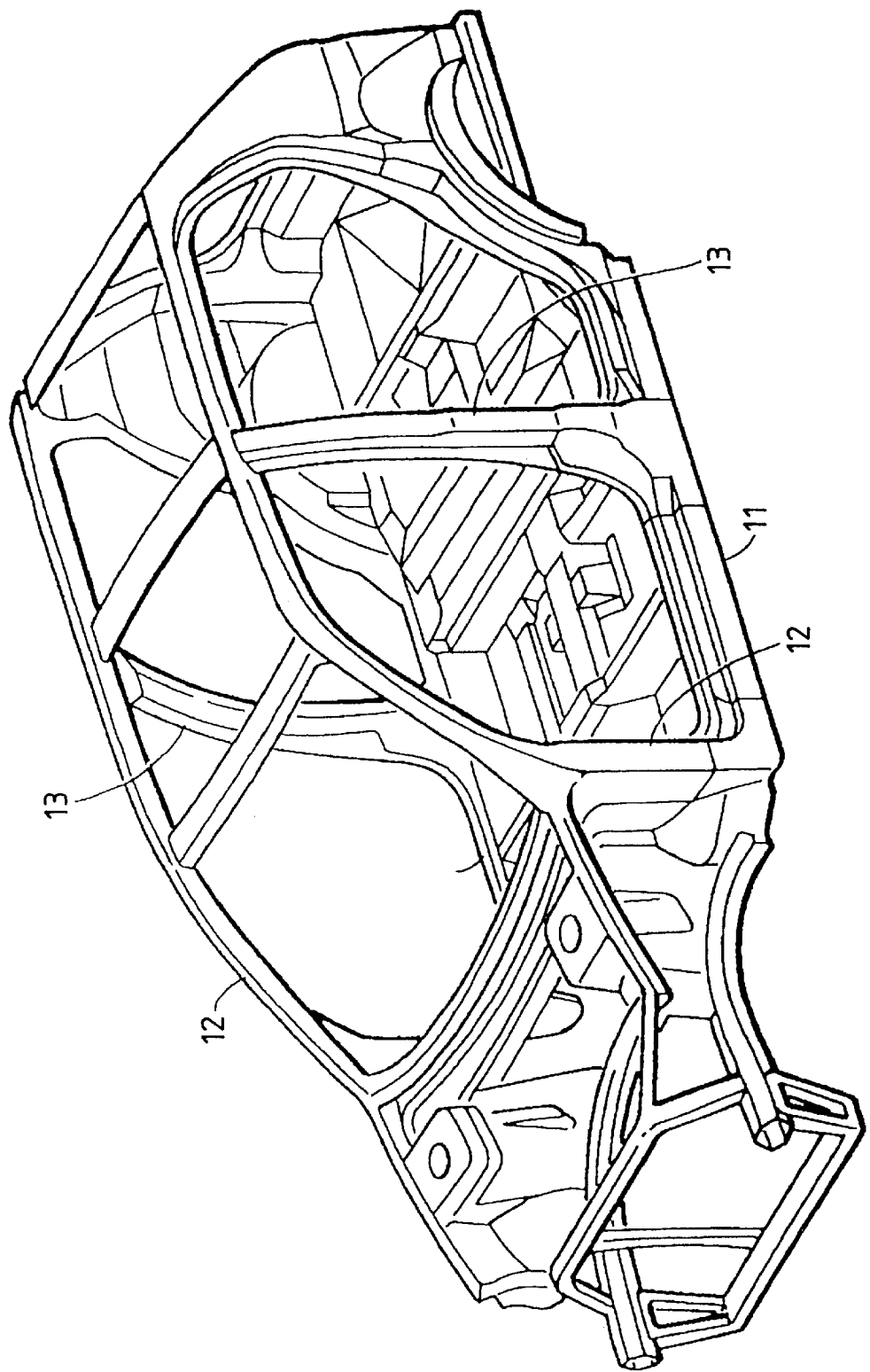
FIG. 5 is a schematic perspective view showing a car frame structure.
Figure 6:
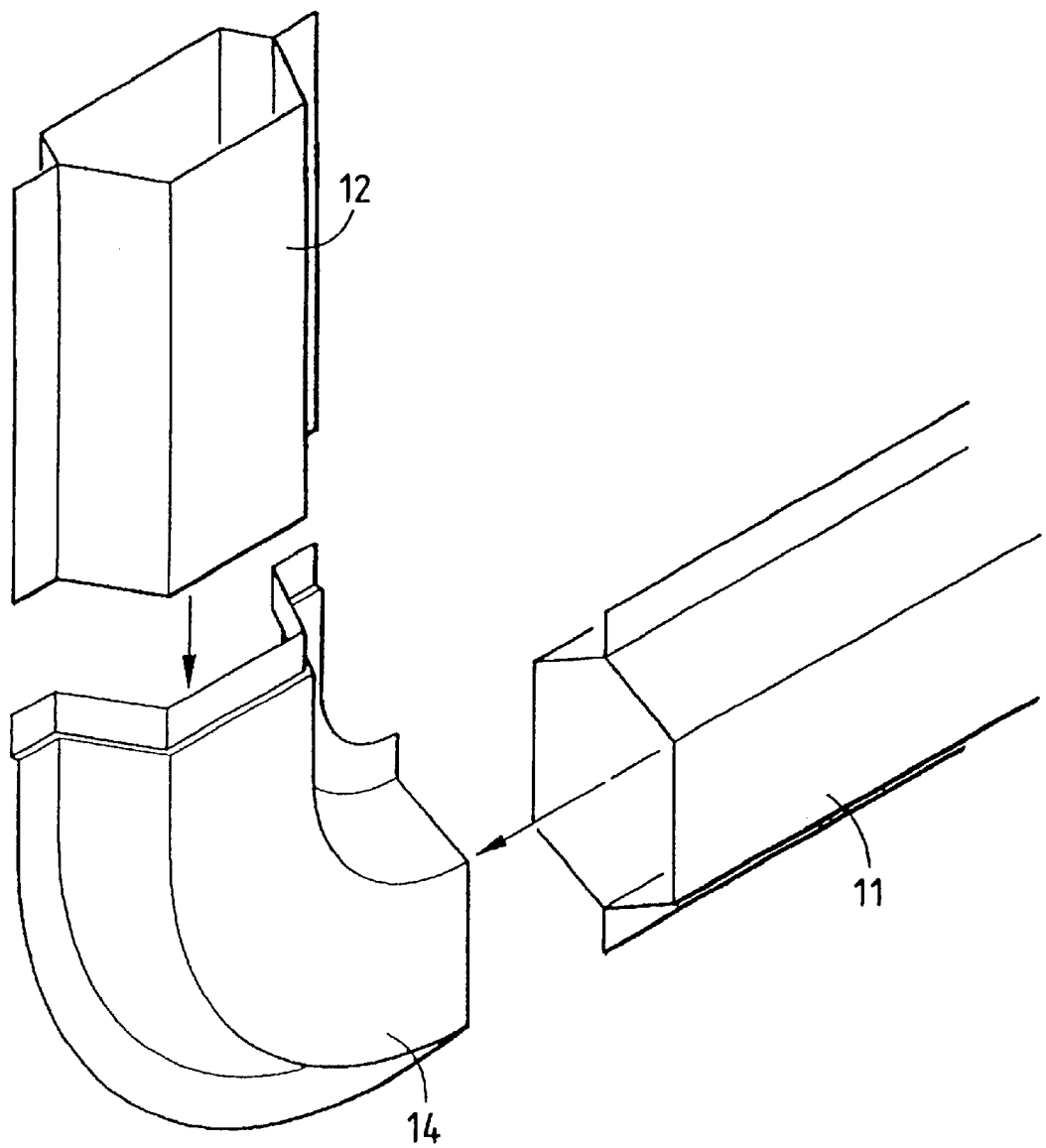
FIG. 6 is a partly enlarged perspective view showing the gist of connection of a side sill and a front pillar in the conventional structure.

As shown in FIG. 4, the lower end portion of the center pillar 5 is cut in accordance with the stairstep shape of the side sill 1. An intermediate wall 5a which is one of constituent parts of a "日" sectional shape is exposed by the cutting of the center pillar 5. An exposed portion of the intermediate wall 5a abuts on the upstanding portion 1c of the side sill 1. Then, welding is given to an edge 5b which is the lower end portion of the center pillar 5 and which abuts on the respective step portions 1a and 1b, and an edge of the intermediate wall 5a which is abutting on the upstanding portion 1c of the side sill 1. As a result, the center pillar 5 is connected to the side sill 1.

Further, a reinforcing member 6 shaped like a reversed T figure corresponding to the outer shape of the connection portion between the side sill 1 and the center pillar 5 is attached in the same manner as described above. Accordingly, also in this case, a necessary strength can be secured even if full welding is not given to the whole of the contact edges between the side sill 1 and the center pillar 5 because spot welding is given to suitable places and the reinforcing member 6 is welded to the respective extruded members.

As described above, in accordance with the present invention, a portion of combination of extruded members can be reinforced with a reinforcing member. Particularly in the case of aluminum extruded members, thermal distortion may occur when the welding length becomes large. The strength of a connection portion between the extruded members, however, can be enhanced even if fall welding is not given. Accordingly, aluminum extruded materials can be used in a car frame structure. Furthermore, a frame structure high in the degree of freedom in design can be provided on the basis of the connection of extruded members having different sectional shapes. Further, when the reinforcing member is shaped like a circular arc, concentration of stress in the reinforcing member can be avoided. Further, when the reinforcing member is constituted by a pair of half parts, the reinforcing member can be assembled to the extruded members having different sectional areas so that the connection portion between the extruded members is entirely enveloped in the reinforcing member. Accordingly, the connection portion between the extruded members having different sectional shapes can be reinforced suitably with the reinforcing member.

While there has been described in connection with the preferred embodiment of the invention, it will be obvious to those skilled in the art that various changes and modifications may be made therein without departing from the invention, and it is aimed, therefore, to cover in the appended claims all such changes and modifications which fall within the true spirit and scope of the invention.

What is claimed is:

1. An extruded material frame connection structure for vehicle, comprising:

a frame assembly constituted by a first extruded member and a second extruded member which are assembled in a state where said first and second extruded members intersect each other and which are welded to each other at an assembled portion thereof so as to be integrated with each other, said second extruded member having a cut out portion wherein a portion of said first extruded member extends into said cut out portion of said second extruded member; and a reinforcing member formed to have a size so that the reinforcing member covers said assembled portion between said first and second extruded members and extends to cover portions of said first and second extruded members, said reinforcing member being assembled to said frame assembly and welded to each of said first and second extruded members.

2. The extruded material frame connection structure for vehicle according to claim 1, wherein said assembled portion between said first and second extruded members is a corner portion of said frame assembly.

3. The extruded material frame connection structure for vehicle according to claim 2, wherein at least one of said first and second extruded members is chamfered at said corner portion, and said reinforcing member has a circular arc portion.

4. The extruded material frame connection structure for vehicle according to claim 1, wherein said reinforcing member is constituted by a pair of half parts having mating surfaces perpendicular to a longitudinal axis of each of said first and second extruded members.

5. The extruded material frame connection structure for vehicle according to claim 2, wherein said reinforcing member is constituted by a pair of half parts having mating surfaces perpendicular to a longitudinal axis of each of said first and second extruded members.

6. The extruded material frame connection structure for vehicle according to claim 3, wherein said reinforcing member is constituted by a pair of half parts having mating surfaces perpendicular to a longitudinal axis of each of said first and second extruded members.

7. The extruded material frame connection structure for vehicle according to claim 1, wherein said first extruded member has a step shape at said assembled portion.

8. The extruded material frame connection structure for vehicle according to claim 7, wherein said step shape of said first extruded member extends beyond said assembled portion and wherein said reinforcing member is shaped to correspond with at least a portion of said step shape of said first extruded member which extends beyond said assembled portion.

9. The extruded material frame connection structure for vehicle according to claim 2, wherein said reinforcing member extends to cover said corner portion of said frame assembly.

* * * * *